United States Patent [19]
Nakata

[11] Patent Number: 5,361,154
[45] Date of Patent: Nov. 1, 1994

[54] METHOD AND APPARATUS FOR PERFORMING WAVELENGTH-TUNING AND CLOCK-SYNCHRONIZATION IN A WAVELENGTH DIVISION MULTIPLEXING OPTICAL COMMUNICATION NETWORK

[75] Inventor: Toru Nakata, Yokohama, Japan

[73] Assignee: Canon Kabushiki Kaisha, Tokyo, Japan

[21] Appl. No.: 70,237

[22] Filed: Jun. 2, 1993

[30] Foreign Application Priority Data

Jun. 6, 1992 [JP] Japan .................................. 4-171833

[51] Int. Cl.$^5$ .......................... H04J 4/00; H04J 14/02; H04B 10/00
[52] U.S. Cl. .................................... 359/123; 359/124; 359/135; 359/158
[58] Field of Search ............................. 359/123–124, 359/128, 133, 135, 139, 158, 173; 370/50

[56] References Cited

U.S. PATENT DOCUMENTS

| | | | |
|---|---|---|---|
| 4,715,028 | 12/1987 | McMahon et al. | 359/118 |
| 4,730,301 | 3/1988 | McMahon | 359/124 |
| 4,742,576 | 5/1988 | McMahon | 359/126 |
| 4,759,011 | 7/1988 | Hicks, Jr. | 359/168 |
| 4,845,703 | 7/1989 | Suzuki | 359/128 |
| 5,086,349 | 2/1992 | Okayama et al. | 359/124 |

FOREIGN PATENT DOCUMENTS 0249112 12/1987 European Pat. Off. .
0268355 5/1988 European Pat. Off. .
2012472 7/1979 United Kingdom .

OTHER PUBLICATIONS

Leonid Kazovsky. Optical Signal Processing for Local-Access Networks, Nov., 1989, pp. 1.3.1–1.3.7.
Pie-Yau Chien and Ci-Ling Pan, Relative Frequency Stabilization of a Set of Laser Diodes Using the Time-Gating Technique; 2319 Optics Communications; 83 (1991) 15 May, No. 1/2, pp. 81–84.
R. S. Tucker, et al., Optical Time-Division Multiplexing and Demultiplexing in a Multigigabit/Second Fibre Transmission System, Electronics Letters, Feb. 26, 1987, vol. 23, No. 5, pp. 208–209.

Primary Examiner—Richard E. Chilcot, Jr.
Assistant Examiner—Kinfe-Michael Negash
Attorney, Agent, or Firm—Fitzpatrick, Cella, Harper & Scinto

[57] ABSTRACT

In a wavelength-tuning and clock-synchronous system in an optical communication network, a reference office transmits a reference signal via a single transmission line. Data of a reference wavelength and data of a reference clock are superposed in the reference signal. A transmitter office supplies an optical signal whose wavelength is tuned based on the reference wavelength extracted from the reference signal and whose clock is synchronized based on the reference clock extracted from the reference signal. A receiver office receives wavelength-division-multiplexed signals as time-division-demultiplexed parallel data by using a clock extracted from the reference signal.

20 Claims, 7 Drawing Sheets

METHOD AND APPARATUS FOR PERFORMING WAVELENGTH-TUNING AND CLOCK-SYNCHRONIZATION IN A WAVELENGTH DIVISION MULTIPLEXING OPTICAL COMMUNICATION NETWORK

BACKGROUND OF THE INVENTION

1. Field of the Invention

The present invention relates to a wavelength-tuning and clock-synchronous system used in a wavelength division multiplexing (WDM) system or network, a WDM optical communication system in which wavelength and clock of a signal transmitted from a transmitter office are respectively tuned and synchronized based on a reference signal transmitted from a reference station, a WDM optical communication system in which a receiver station time-division demultiplexes wavelength division multiplexed signals of plural wavelengths based on a reference signal transmitted from a reference station, a WDM optical communication system in which these techniques are appropriately combined and the like.

2. Related Background Art

In wavelength division multiplexing (WDM) optical communication systems, different wavelengths are individually assigned to a plurality of transmitter offices or stations, and it is necessary to tune these wavelengths to oscillation wavelengths of the reference light source respectively, and at the same time to synchronize clocks of the transmitter stations, which determine a transmission speed of the system, with each other.

Figure 1:
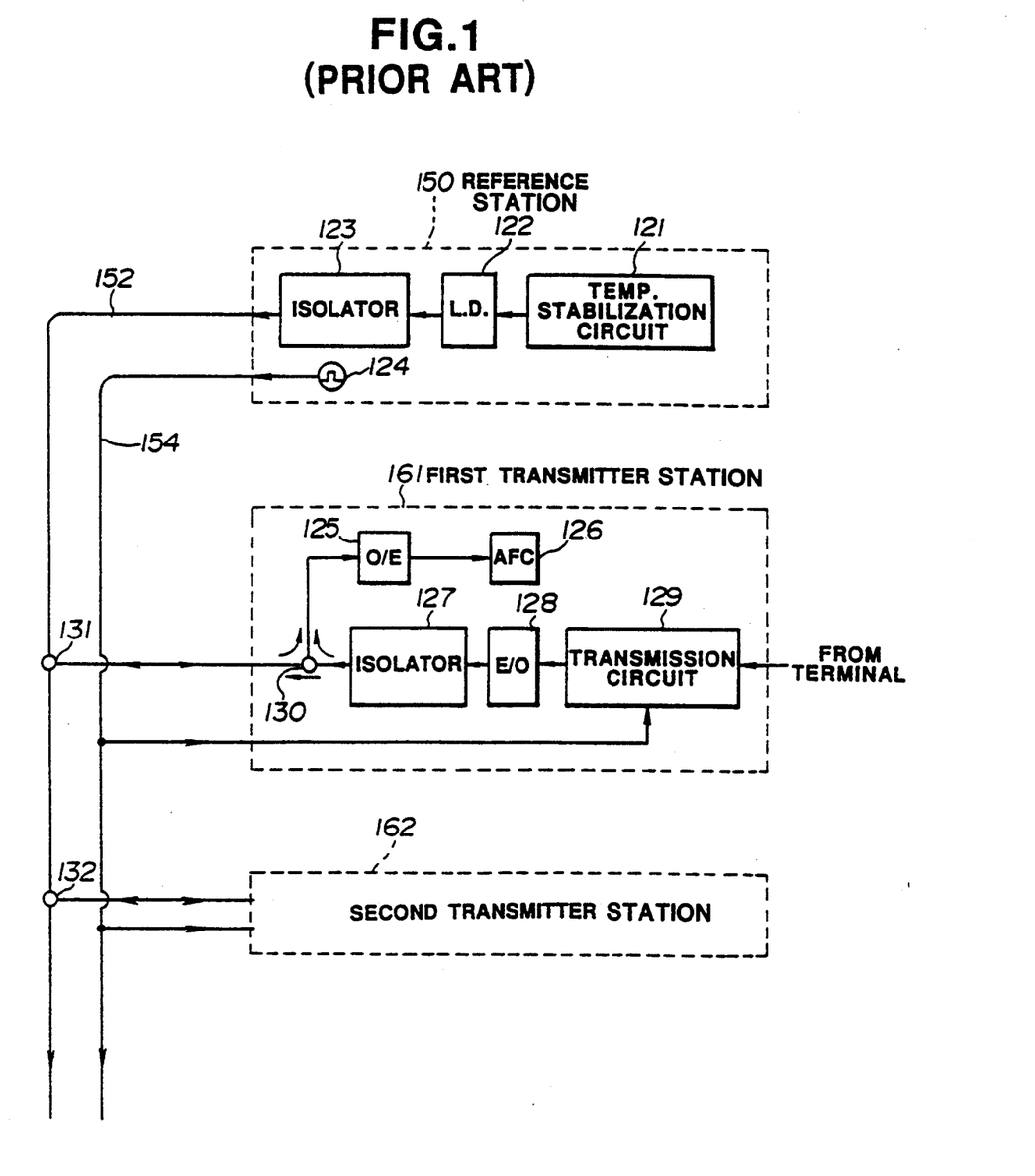
FIG. 1 is a block diagram showing a first prior art system.

A prior art wavelength-tuning and clock-synchronous system in such a WDM optical communication system will be described with reference to FIG. 1. In FIG. 1, reference numeral 150 designates a reference station, and the reference station 150 has a temperature stabilization circuit 121 for stabilizing the oscillation wavelength of a laser diode (LD) 122. The laser diode 122 is a multimode-laser diode 122 for supplying light of reference or absolute wavelengths, an isolator for interrupting light from a transmission line or optical fiber 152 and a circuit 124 for generating a reference clock. Reference numerals 161 and 162 respectively designate first and second transmitter stations, and each of the transmitter stations 161 and 162 includes an O/E converter 125 for converting an input signal light to an electric signal, an auto-frequency control (AFC) circuit 126 for stabilizing the wavelength of an output light of an E/O converter 128 based on the electric signal from the O/E converter 125, an isolator 127 for interrupting light from the transmission line 152, an E/O converter for converting an electric signal from a transmission circuit 129 to an optical signal while the wavelength of the optical signal is being controlled by the AFC circuit 126, a transmission circuit 129 for processing a signal from a terminal which is synchronized with the clock from a transmission line or coaxial cable 154 to generate a digital signal, and a branching-combining (b-c) device 130 for branching and/or combining the optical signal. Reference numerals 131 and 132 respectively designate branching-combining devices disposed on the optical fiber 152. As described above, the transmission line 152 is, for example, an optical fiber, and the transmission line 154 is, for example, a coaxial cable.

Initially, the wavelength-tuning will be described. The reference station 150 supplies light of absolute wavelengths to the respective transmitter stations 161, 162, ..., and the respective transmitter stations conduct tuning to assigned wavelengths. Thus, the wavelength tuning is achieved in each transmitter station. The multimode laser diode 122 is used as a reference light source for emitting light of absolute wavelengths, and each one of the wavelengths in its longitudinal mode is assigned to each transmitter office. Since the oscillation wavelength of the multimode laser diode 122 is changeable depending on a change in temperature, the oscillation wavelength needs to be stabilized by the temperature stabilization circuit 121. Thus, light of reference wavelengths is supplied to each transmitter station. The light of reference wavelengths output by the multimode laser diode 122 is transmitted to the optical fiber transmission line 152 via the isolator 123, and is branched by the respective b-c devices 131, 132, ... to be input into the respective transmitter stations 161, 162, ... Light of reference wavelengths input into the transmitter station is further branched by the b-c device 130 to be input into the O/E converter 125. At the same time, the output light of the E/O converter 128 is supplied through the isolator 127 and is branched by the b-c device 130. One of the divided lights is transmitted to the light transmission line 152, while the other one is input into the O/E converter 125.

At this time, the wavelength of the output light from the E/O converter 128 is previously set to a value that is in the vicinity of the wavelength assigned to the associated terminal. Further, the reference light incident on the O/E converter 125 and the signal light from the E/O converter 128 are converted to electric signals by the O/E converter 125. Therefore, a beat voltage, which corresponds to a wavelength difference between the reference light and the signal light from the E/O converter 128, is generated. The AFC circuit 126 controls the E/O converter 128 so that the amplitude of the beat signal is maintained at a constant value. That control signal is supplied to the E/O converter 128 as a control current, through a wavelength control terminal of the E/O converter 128. In the above manner, each transmitter station performs wavelength tuning based on light of reference wavelengths supplied from the reference station 150.

Turning to the clock synchronization, a stable clock generating circuit 124 is disposed in the reference station 150, and a reference clock is supplied to the respective transmitter stations 161, 162, ... through the coaxial cable 154. The clock input into the transmitter station is supplied to the transmission circuit 129, and a signal from the terminal is processed thereby to generate the digital signal in the transmission circuit 129. The digital signal is then converted to the optical signal by the E/O converter 128 to be transmitted to the transmission line 152. Thus, all the transmitter stations 161, 162, ... are synchronized with the reference station 150.

Figure 2:
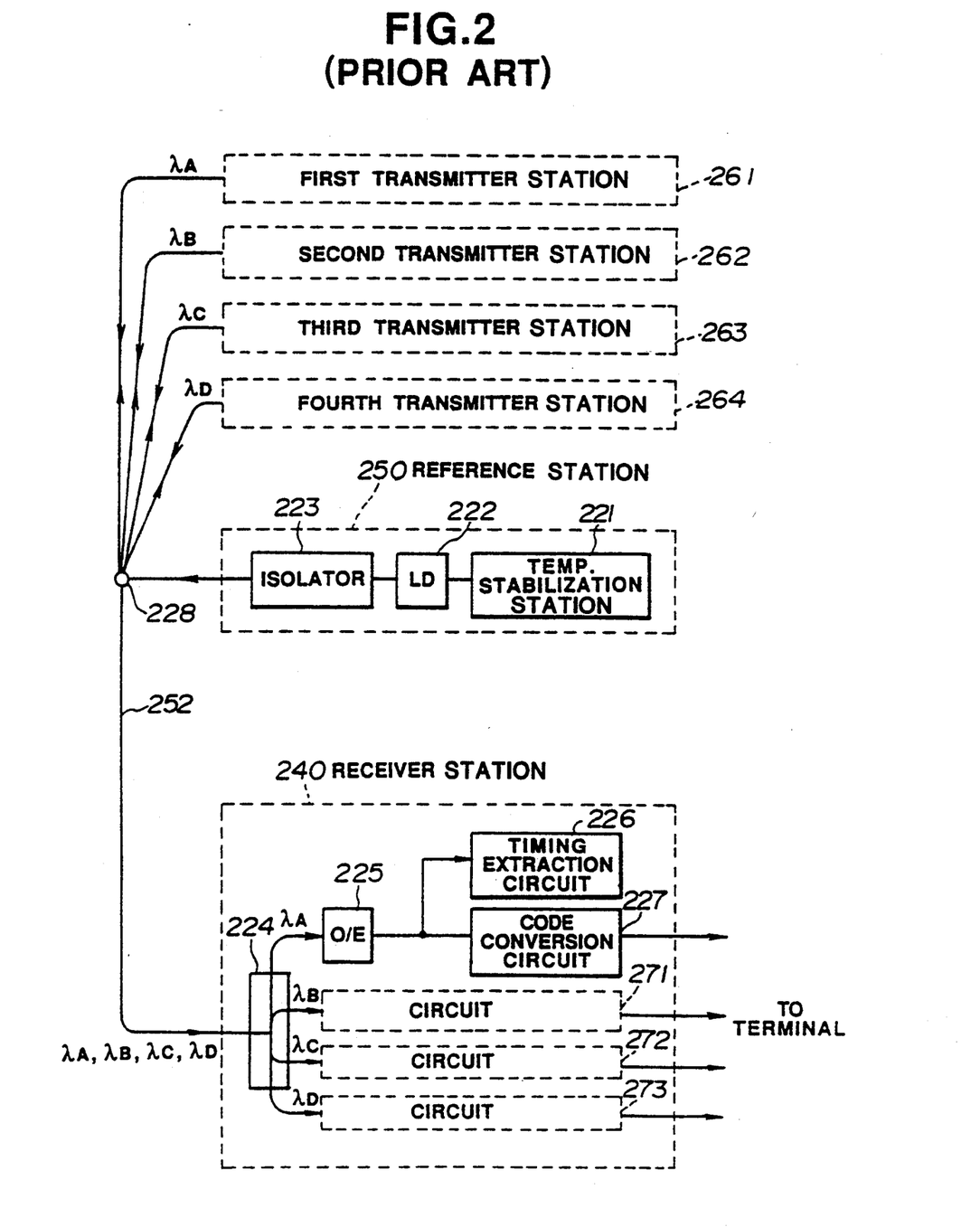
FIG. 2 is a block diagram showing another prior art system.

Another prior art WDM optical communication system will be described with reference to FIG. 2. In FIG. 2, reference numeral 250 designates a reference station, and the reference station 250 includes a temperature stabilization circuit 221 for stabilizing oscillation wavelengths of a laser diode 222. The laser diode 222 is a multimode laser diode 222 for emitting light of reference wavelengths. The reference station also includes an isolator for interrupting light from a transmission line 252. Reference numeral 240 designates a receiver station, and the receiver station 240 includes a demultiplexer 224 for demultiplexing the optical signals of wavelengths, an O/E converter 225 for converting the optical signal at a predetermined wavelength from the demultiplexer 224 to an electric signal, a timing extraction circuit 226 for extracting a timing component from a received signal to reproduce the clock, and a code conversion circuit 227 for converting a coded signal from the transmitter station to an original. A reference numeral 228 designates a branching-combining device for branching and/or combining the optical signal.

In the system of FIG. 2, wavelengths $\lambda A-\lambda D$ are respectively assigned to the transmitter stations 261-264, multiplexed lights of such wavelengths are transmitted through the light transmission line 252, and the receiver station 240 demultiplexes the multiplexed wavelengths into signals of respective wavelengths. The reference station 250 supplies lights of stable absolute wavelengths to the respective transmitter stations, and each transmitter station stabilizes its own oscillation wavelength based on the reference wavelengths of reference light, as described in FIG. 1. The multimode laser diode 222 is used as a reference light source for emitting reference light of absolute wavelengths, and each one wavelength thereof in its longitudinal mode is assigned to each transmitter station. Since the oscillation wavelength of the multimode laser diode 222 varies depending on a change in temperature, the laser diode 222 supplies light of reference wavelengths under a condition under which the wavelengths are stabilized by the temperature stabilization circuit 221. The reference light output from the laser diode 222 passes through the isolator 223, is transmitted to the light transmission line 252, is branched by the b-c device 228 and enters the respective transmitter stations 261-264. In the respective transmitter stations, their light sources are respectively tuned to the assigned wavelengths of the reference light. Thereafter, each transmitter station performs an optical communication at the assigned wavelength. Thus, optical signals of wavelengths $\lambda A-\lambda D$ are respectively supplied from the transmitter stations 261, 262, 263 and 264, are combined by the b-c device 228, and are transmitted to the receiver station 240 through the transmission line 252. In this example, a reference clock is not used, unlike the example of FIG. 1.

The optical signal input into the receiver station 240 is demultiplexed into signals of respective wavelengths $\lambda A-\lambda D$ by the demultiplexer 224, and the signal of wavelength $\lambda A$, for example, is converted to an electric signal by the O/E converter 225. The timing extraction circuit 226 extracts the timing component from the received signal to regenerate the clock. The timing extraction circuit 226 operates the code conversion circuit 227 at such a timing. The code conversion circuit 227 converts the coded signal transmitted from the transmitter station to its original signal and supplies the original signal to the terminal. Similarly, the signals at wavelengths $\lambda B-\lambda D$ are respectively converted to electric signals at circuits 271, 272 and 273, and thereafter the electric signals are code-converted with the extracted clock. Thus, the coded signals at wavelengths $\lambda A-\lambda D$ are respectively received. In the above-discussed manner, WDM signal is demultiplexed into signals at respective wavelengths by the receiver station 240 to achieve optical communication.

In the prior art example of FIG. 1, however, the light of reference wavelengths for wavelength-tuning and the reference clock for clock-synchronization are respectively transmitted via separate transmission lines from the reference station to the transmitter stations, in WDM communications. As a result, cost for transmission lines increases.

Further, in the prior art example shown in FIG. 2, optical receivers need to be used for respective wavelengths of the WDM communication, the transmitted code needs to be converted to such a code that has a timing component (e.g., CMI and RZ code) in the transmitter station so that the clock can be regenerated in the receiver station, and thus the size of circuits in transmitter and receiver stations increases.

SUMMARY OF THE INVENTION

It is a first object of the present invention to provide a wavelength-tuning and clock-synchronous system of an optical communication network in which a reference station supplies a reference signal via a single transmission line, and a wavelength division multiplexing optical communication network using such a system.

It is a second object of the present invention to provide a wavelength-tuning and clock-synchronous system of an optical communication network in which a reference station supplies a reference signal via a single transmission line and a transmitter station performs wavelength-tuning and clock-synchronization based on the reference signal from the reference station, and a wavelength division multiplexing optical communication network using such a system.

It is a third object of the present invention to provide a wavelength-tuning and clock-synchronous system of an optical communication network in which wavelength division multiplexed signals are demultiplexed and received by a single receiver, and a wavelength-tuning and clock-synchronous system in which a clock can be regenerated without coding a transmitted signal.

According to one aspect of the invention, a method of wavelength-tuning and clock-synchronizing of an optical communication network comprises a step of transmitting a reference signal, in which data of a reference wavelength and data of a reference clock are superposed, from a reference station, a step of tuning a wavelength of a signal, which is to be transmitted, based on the reference wavelength of the reference signal, in a transmitter station, and a step of synchronizing a clock, at which the signal is transmitted from the transmitter station, based on the reference clock extracted from the reference signal, in the transmitter station.

According to another aspect of the invention, a wavelength division multiplexing optical communication network comprises a reference station for transmitting a reference signal, in which data of a reference wavelength and data of a reference clock are superposed, and a transmitter station. In the transmitter station, the tuning of a wavelength of a signal, which is to be transmitted from the transmitter station, based on the reference wavelength of the reference signal is performed. Further, in the transmitter station the synchronization of a clock, at which the signal is transmitted from the transmitter station, based on the reference clock extracted from the reference signal, is performed.

According to another aspect of the invention, a method of wavelength-tuning and clock-synchronizing in an optical communication network comprises a step of transmitting a reference signal, in which data of a reference wavelength and data of a reference clock are superposed, from a reference station, a step of tuning a wavelength of a signal, which is to be transmitted, based on the reference wavelength of the reference signal, in a transmitter station, a step of synchronizing a clock, when the signal is transmitted from the transmitter station, based on the reference clock extracted from the reference signal, in the transmitter station, a step of extracting a clock from the reference signal in a receiver station, and a step of receiving wavelength-division-multiplexed signals as time-division-demultiplexed parallel data by using the extracted clock in the receiver station.

According to another aspect of the invention, a wavelength division multiplexing optical communication network comprises a reference station for transmitting a reference signal, in which data of a reference wavelength and data of a reference clock are superposed, a transmitter station, and a receiver station for receiving wavelength-division-multiplexed signals as time-division-demultiplexed parallel data by using a clock extracted from the reference signal. In the transmitter station, tuning of a wavelength of a signal, which is to be transmitted from the transmitter station, based on the reference wavelength of the reference signal, is performed. Further, in the transmitter station, synchronization of a clock, when the signal is transmitted from the transmitter station, based on the reference clock extracted from the reference signal, is performed.

According to another aspect of the invention, a method of wavelength-tuning and clock-synchronization in an optical communication network comprises a step of transmitting a reference signal, in which data of a reference wavelength and data of a reference clock are superposed from a reference station.

According to another aspect of the invention, a wavelength division multiplexing optical communication network comprises a reference station for transmitting a reference signal, in which data of a reference wavelength and data of a reference clock are superposed.

These advantages and others will be more readily understood in connection with the following detailed description of the preferred embodiments in conjunction with the drawings.

DESCRIPTION OF THE PREFERRED EMBODIMENT

First Embodiment

Figure 3:
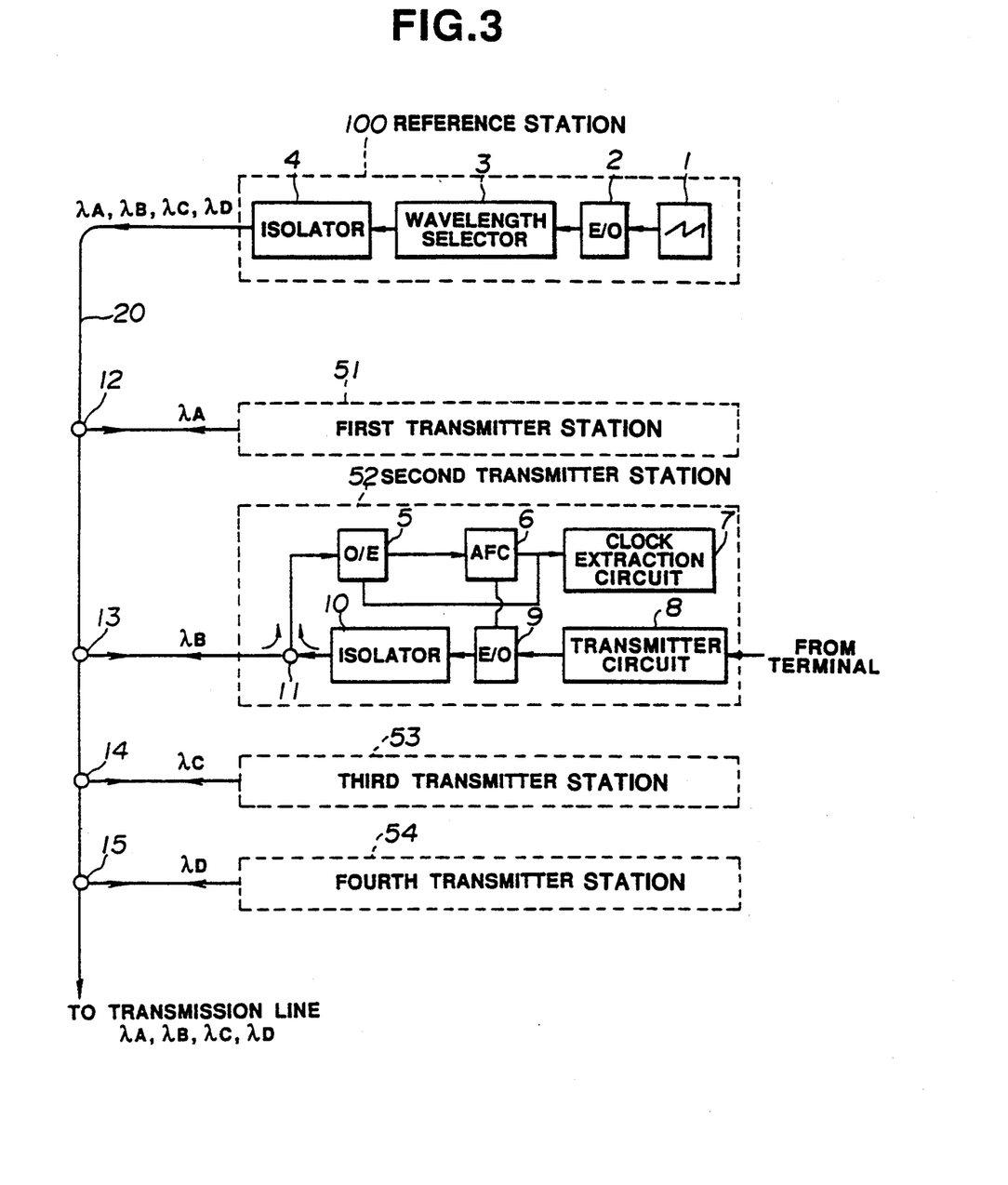
FIG. 3 is a block diagram showing a first embodiment according to the present invention.

FIG. 3 is a block diagram showing a first embodiment of the present invention. FIGS. 4A-4D respectively show waveforms at portions in the structure shown in FIG. 3.

In FIG. 3, reference numeral 100 designates a reference station, and the reference station 100 includes a sawtooth waveform generating circuit 1 for generating a sawtooth waveform current, an E/O converter 2 for converting current supplied by the sawtooth waveform generating circuit 1 to light, a light wavelength selector 3 for selecting light of a predetermined wavelength from the light supplied from the E/O converter 2, and an isolator 4 for interrupting light from a transmission line 20 while transmitting therethrough the light from the wavelength selector 3. Reference numeral 51–54 respectively designate transmitter stations, each of the transmitter stations 51–54 includes an O/E converter 5 for converting lights from the E/O converter 2 in the reference station 100 and an E/O converter 9 of the associated transmitter station to electric signals, an auto-frequency control (AFC) circuit 6 for stabilizing an output wavelength of the E/O converter 9 based on the reference wavelength supplied from the reference station 100, a clock extraction circuit 7 for extracting a clock from the signal received by the O/E converter 5, a digital transmitter circuit 8 for processing data from an associated terminal by using the clock supplied from the clock extraction circuit 7 to generate a digital signal, an E/O converter 9 for converting the electric digital signal from the digital transmitter circuit 8 to an optical signal, and an isolator 10 for interrupting light from the transmission line 20 while transmitting therethrough the optical signal from the E/O converter 9. The AFC circuit 6 comprises, for example, a circuit for controlling the output wavelength of the E/O converter 9 so that the amplitude of a beat signal (between the light at reference wavelength from the reference station 100 and the light from the E/O converter 9 in the associated transmitter station) from the O/E converter 5 is maintained at a constant value.

Reference numerals 11–15 respectively designate branching-combining (b-c) devices for branching and/or combining light in both opposite directions. The transmitter stations 51, 53 and 54 respectively have the same structure as that of the transmitter station 52.

The E/O converters 2 and 9 are respectively light emitting devices whose oscillation wavelengths are changeable by a change in the amount of current injected through a wavelength control terminal thereof, and distributed feedback (DFB) lasers and distributed Bragg reflection (DBR) lasers, for example, are usable as such a light emitting device. The wavelength selector 3 is a device for transmitting therethrough an input light whose wavelength coincides with a resonance wavelength of the selector 3, and Fabry-Perot etalon optical resonators, for example, can be used as the wavelength selector. As the O/E converter 5, PIN-photodiodes (PD) and avalanche photodiodes (APD), for example, are available.

Figure 4A:
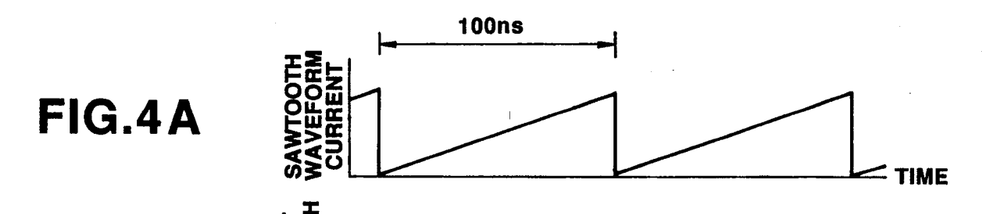
FIGS. 4A-4D are respectively graphs showing waveforms at portions in FIG. 3.

The wavelength-tuning and clock synchronization will be described with reference to FIG. 3. In this embodiment, it is assumed that wavelengths $\lambda A$–$\lambda D$ are respectively assigned to the first to fourth transmitter stations 51–54 and that the system clock frequency is 40 MHz. In the reference station 100, the sawtooth waveform generating circuit 1 supplies a sawtooth waveform current of periods of 100 ns (i.e., 10 MHz) as shown in FIG. 4A to the wavelength control terminal of the E/O converter 2. The sawtooth waveform current is a varying current for causing the output wavelength of the E/O converter 2 to vary at periods corresponding to a value that is four times a resonance wavelength interval of the wavelength selector 3.

Figure 4B:
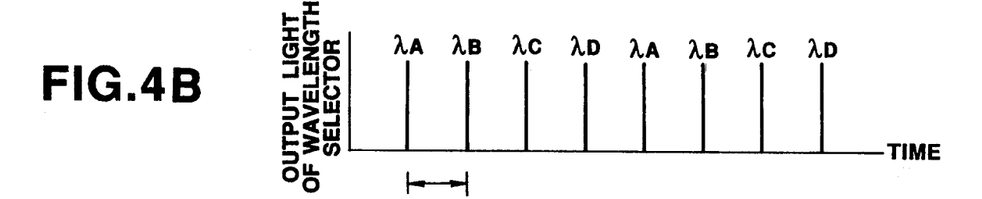

The wavelength of the output light of the E/O converter 2 is varied at periods of 100 ns (i.e., four times the resonance wavelength interval of the wavelength selector 3) by the sawtooth waveform current. If this output light enters the wavelength selector 3, the wavelength selector 3 supplies an output when the wavelength of the incident light thereon coincides with the resonance wavelength of the wavelength selector 3. The output of the selector 3 is composed of pulses at wavelengths λA, λB, λC and λD consecutively emitted at intervals of 25 ns, as shown in FIG. 4B. The pulses are transmitted through the isolator 4 to be output into the light transmission line 20.

Next, the wavelength-tuning and clock-synchronization, which are effected in the transmitter stations 51–54 based on the pulses from the reference station 100, will be described. The reference pulses shown in FIG. 4B supplied from the reference station 100 are branched by the b-c devices 12–15, and input into the respective transmitter stations 51–54. The reference pulses incident on the second transmitter station 52 are branched by the b-c device 11 and input into the O/E converter 5. The light branching towards the isolator 10 is interrupted thereby. At the same time, the output light from the E/O converter 9 passes through the isolator 10 and is divided by the b-c device 11. One of the divided lights is transmitted to the transmission line 20, while the other one is input into the O/E converter 5. Here, the wavelength λB is beforehand assigned to the second transmitter station 2, and therefore, the output light of the E/O converter 9 is initially supplied at a wavelength near the reference wavelength λB.

Figure 4C:
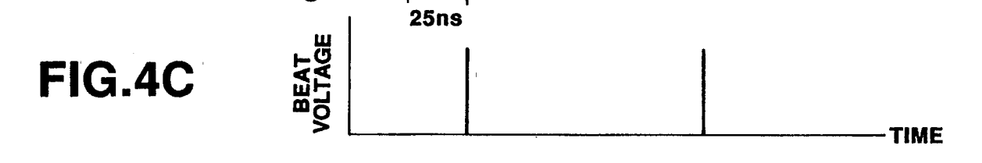
Figure 4D:
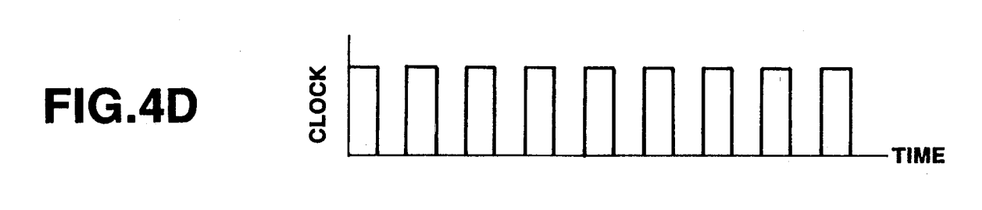

The reference pulses incident on the O/E converter 5 and the signal light from the E/O converter 9 are respectively converted to electric signals by the O/E converter 5. At this time, a beat voltage is generated, which corresponds to a wavelength difference between the pulse light at wavelength λB of the reference light and the signal light from the E/O converter 9, and thus beat pulses as shown in FIG. 4C are obtained. The beat pulses are input into the AFC circuit 6.

The amplitude of the beat signal increases as the wavelength difference between the reference light and the light from the E/O converter 9 decreases, while the amplitude lessens as the wavelength difference enlarges. Therefore, the AFC circuit 6 controls the wavelength of the output of the E/O converter 9 so that the amplitude of the beat signal is made constant, for example, by detecting the amplitude of the beat signal. The control signal can be supplied through the wavelength control terminal of the E/O converter 9 as a control current. Thus, the second transmitter station 52 can stably output a signal at the wavelength λB based on the reference light from the reference station 100 shown in FIG. 4B. Similarly, the first, third and fourth transmitter stations 51, 53 and 54 can tune their signal lights to wavelengths λA, λC and λD based on the reference light supplied from the reference station 100.

Next, the clock-synchronization will be described. Part of the signal converted to an electric signal by the O/E converter 5 is input into the clock extraction circuit 7. The clock extraction circuit 7 extracts only a signal component supplied from the reference station 100 as shown in FIG. 4B, from among the signal from the reference station 100, the signal from the associated station and signals from the other stations, and regenerates a clock which has a certain logic amplitude. Since the pulse signal from the reference station 100 contains a clock component of 40 MHz, the clock can be readily regenerated by separating or filtering the reference signal by using a filter of 40 MHz or the like (see FIG. 4D). The signal from the terminal is processed in the digital transmitter circuit 8 by using the clock shown in FIG. 4D, and the processed digital signal is converted to an optical signal by the E/O converter 9 to be transmitted to the transmission line 20. Thus, clock-synchronization is achieved in the second transmitter station 52 based on the reference light as shown in FIG. 4B from the reference station 100. Similarly, clock-synchronization is achieved based on the reference light from the common reference station 100 also in respective transmitter stations 51, 53 and 54. Thus, clock-synchronization is performed in all the transmitter stations.

Although the clock frequency is set to 40 MHz and four wavelengths are used in the system of this embodiment, figures are not limited thereto. When a change in the clock frequency is desired, the period of a sawtooth waveform in the reference station 100 may be set to a necessary period. Further, when a change in the number of wavelengths is desired, the amount of current in a sawtooth waveform may be set to a desired value.

Second Embodiment

Figure 5:
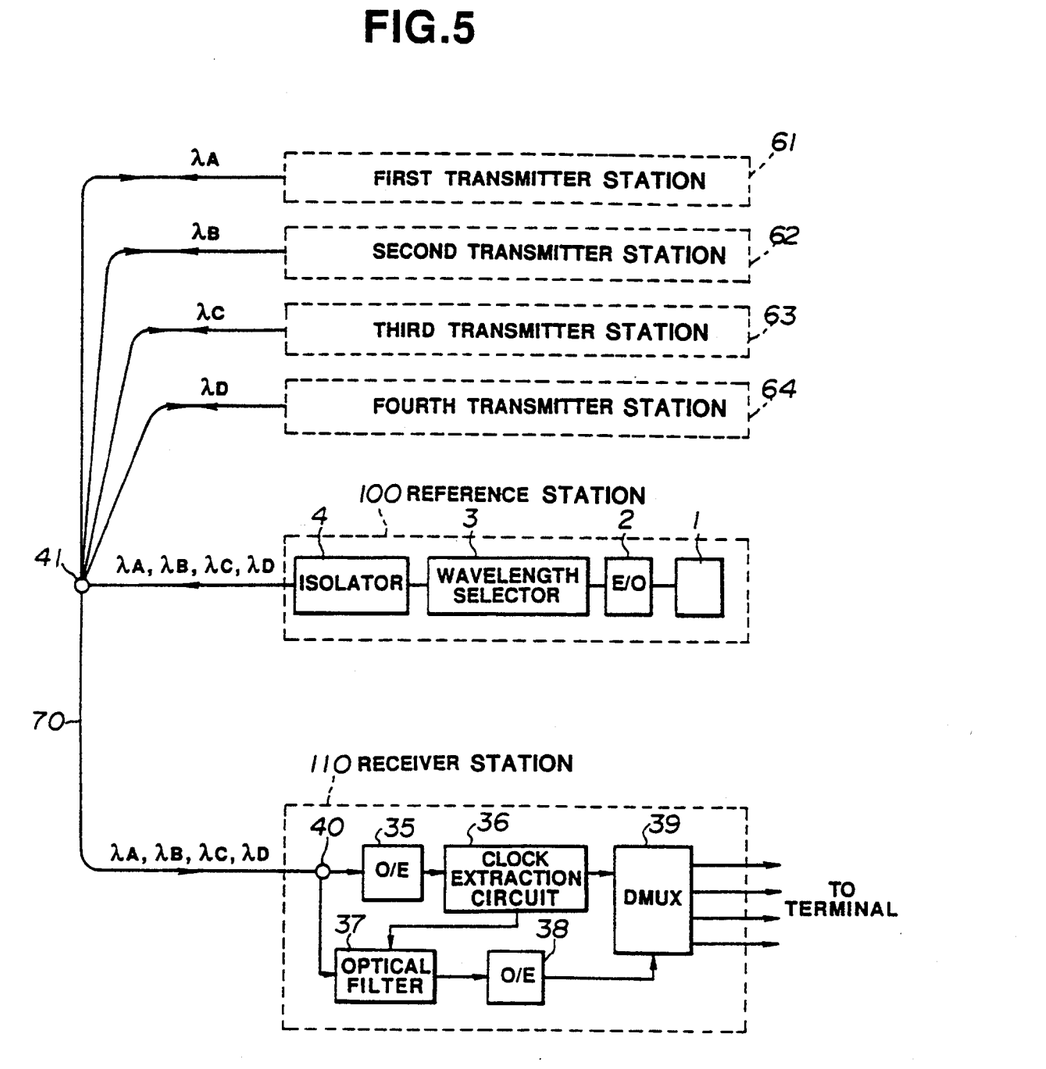
FIG. 5 is a block diagram showing a second embodiment according to the present invention.

FIG. 5 is a block diagram of a second embodiment of the present invention. FIGS. 6A–6F are respectively graphs showing waveforms at portions of the second embodiment shown in FIG. 5.

In FIG. 5, a reference station 100 is the same as that of FIG. 3. Transmitter stations 61–64 are also substantially the same as those of FIG. 3. In FIG. 5, a receiver station 110 includes an O/E converter 35 for converting an optical signal from a transmission line 70 to an electric signal, a clock extraction circuit 36 for extracting a clock component supplied by the reference station 100 from the electric signal from the O/E converter 35, a tunable filter 37 for transmitting only a signal at a predetermined wavelength of the optical signal from the transmission line 70 under the control of the clock extraction circuit 36, an O/E converter 38 for converting the optical signal transmitted through the tunable optical filter 37 to an electric signal, and a time-division demultiplexing (DMUX) circuit 39 for time-division demultiplexing the signal from the O/E converter 38. Reference numerals 40 and 41 designate branching-combining (b-c) devices for branching and/or combining the optical signal.

As the O/E converters 35 and 38 in the receiver station 110, PIN-PDs or APDs are available. The optical filter 37 is a filter whose wavelength of the transmitted light is changeable by controlling the amount of current injected through its wavelength control terminal, and, for example, a DFB laser structure can be utilized as the optical filter 37.

The time-division demultiplexing of the optical signal supplied from the transmitter stations 61–64 will be described with reference to FIG. 6. In this embodiment, as shown in FIG. 5, oscillation wavelengths of the transmitter stations 61–64 are respectively set to wavelengths λA–λD based on the reference signal from the reference station 100, and the clock frequency is synchronized with 10 MHz by frequency-demultiplying the regenerated clock of 40 MHz. The receiver station 110 time-division demultiplexes optical signals at wavelengths λA–λD base on the reference signal from the reference station 100.

The operation of the transmitter stations 61-64 will be described. The reference light output from the reference station 100 are input into the transmitter stations 61-64 and the receiver station 110 through the b-c device 41. The transmitter stations 61-64 respectively stabilize oscillation wavelengths of transmitting light sources at previously assigned wavelengths based on the reference light. At the same time, the clock of 10 MHz is extracted (see FIG. 6C), and the transmitted data is created by using this clock. Thus, the wavelengths and clocks of the transmitter stations 61-64 are synchronized to those of the reference station 100. This is substantially the same as the first embodiment (see FIGS. 6A-6C).

Figure 6A:
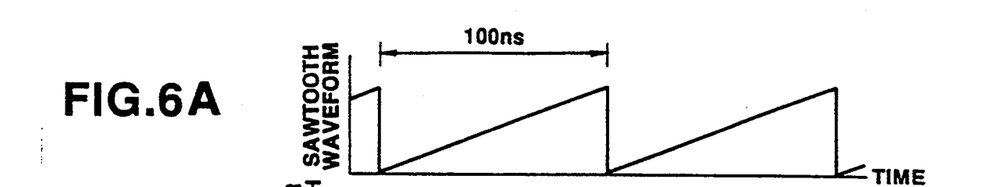
FIGS. 6A-6F are respectively graphs showing waveforms at portions in FIG. 5.
Figure 6B:
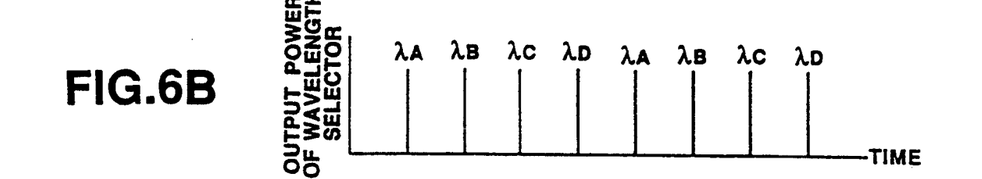
Figure 6C:
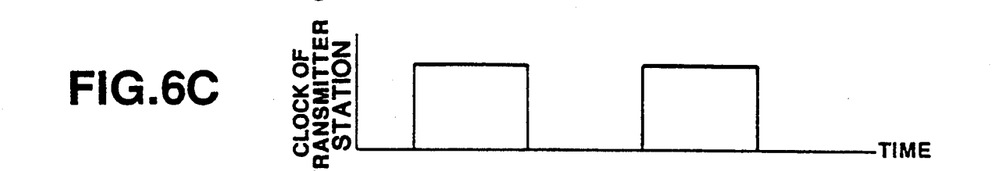
Figure 6D:
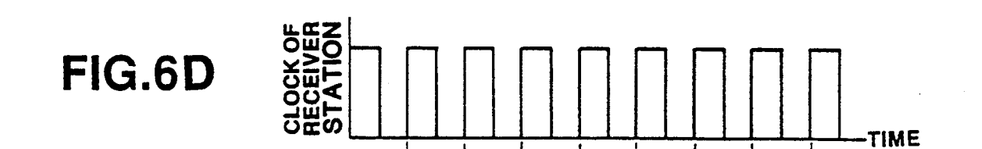
Figure 6E:
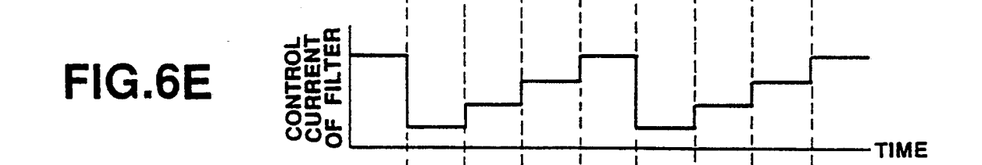
Figure 6F:
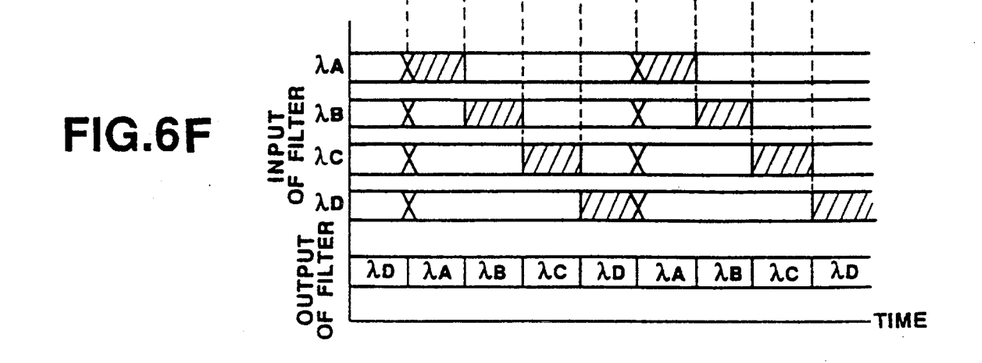

Next, the manner, in which optical signals of wavelengths supplied from the transmitter stations synchronized with the reference station 100 are time-division demultiplexed, will be described. The output signals of the reference station 100 and the transmitter stations 61-64 are input into the receiver station 110, and are branched by the b-c device 40. One of the divided signals is input into the O/E converter 35, while the other one is input into the optical filter 37. The O/E converter 35 converts the optical signal to an electric signal, and supplies the electric signal to the clock extraction circuit 36. The clock extraction circuit 36 extracts a clock component of 40 MHz supplied from the reference station 100 from the electric signal from the O/E converter 35, and regenerates pulses of a constant logic amplitude (see FIG. 6D). Further, currents corresponding to wavelengths λA-λD of current-wavelength characteristics of the optical filter 37 are generated at the clock period as shown in FIG. 6E, and the current is supplied to the wavelength control terminal of the optical filter 37. The optical filter 37 changes the transmission wavelength at intervals of 25 ns from λA to λD through λB, λC under the control of its control current, as shown in FIG. 6F, and therefore, the signals of wavelengths λA-λD are time-division demultiplexed by the optical filter 37 and output therefrom. The output from the optical filter 37 is input into the O/E converter 38 and converted to an electric signal thereby. The electric signal is input into the DMUX circuit 39. The DMUX circuit 39 converts serial data from the O/E converter 38 (see FIG. 6F) to parallel data by using the clock from the clock extraction circuit 36 (see FIG. 6D), and separates the data. Thus, data from the transmitter stations 61-64 can be time-division demultiplexed by using the reference signal from the reference station 100.

Although the data speed is set to 10 Mb/s and demultiplexing of signals at four wavelengths are used in the system of this embodiment, figures are not limited thereto. When a change in the data speed is desired, the period of a sawtooth waveform in the reference station 100 may be set to a necessary period. Further, when a change in the number of wavelengths is desired, the amount of current in a sawtooth waveform may be set to a desired value.

Other Embodiments

Figure 7:
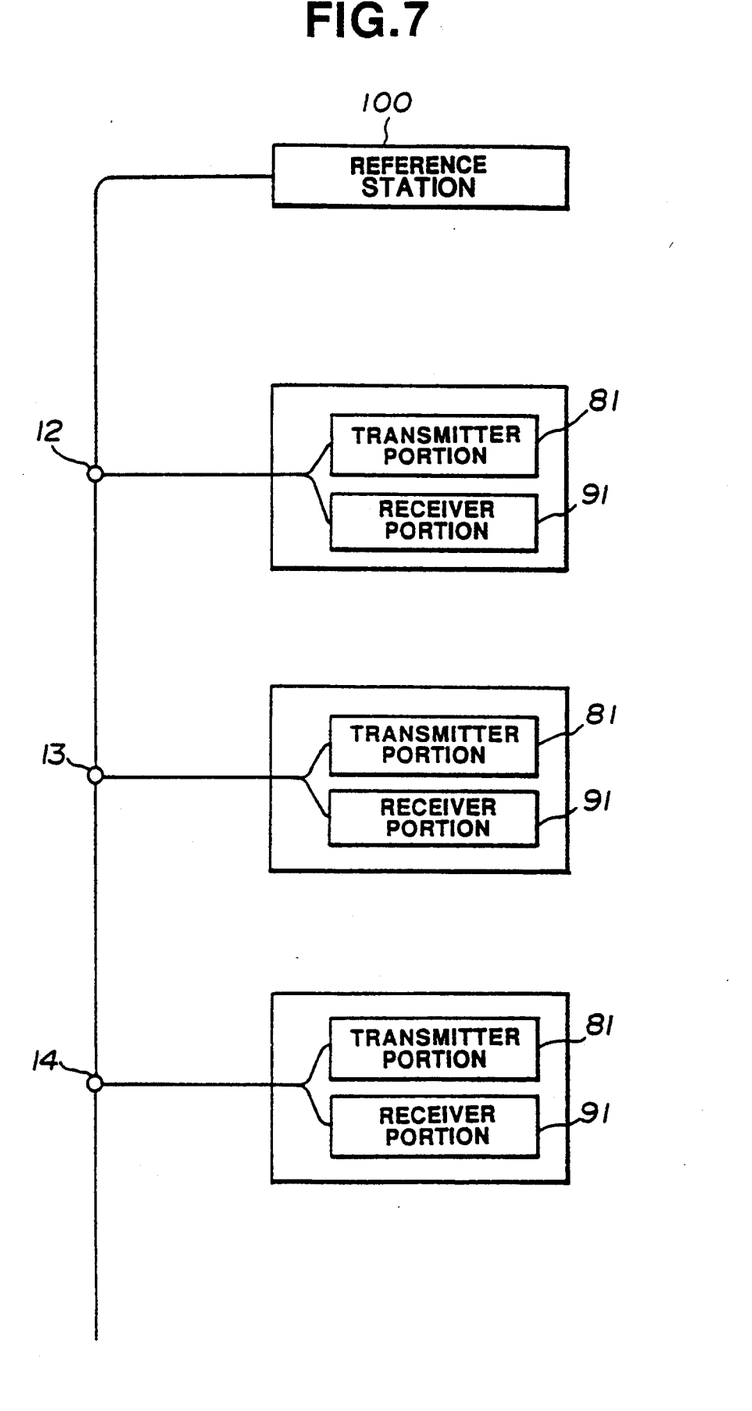
FIG. 7 is a block diagram showing an example of a system in which the system of FIG. 3 is usable.

The wavelength-tuning and clock-synchronization systems as described with reference to FIGS. 3 and 4A-4D can be employed in a tuning-synchronization system of a transmitter unit in an end station which comprises a transmitter portion 81 and a receiver portion 91 as shown in FIG. 7.

Further, in bus type optical communication networks and star type optical communication networks, receiving can be achieved in a time-division demultiplexing system using the system described in FIGS. 5 and 6A-6F As described in the foregoing, according to the present invention, wavelength information and clock information are superposed in a reference signal supplied from a reference station, and hence wavelength-tuning and clock-synchronization can be executed, for example, by connecting the reference station and the transmitter station with a single transmission line. As a result, cost of the transmission line can be reduced.

Further, according to the present invention, a clock component is contained in a reference light supplied from a reference station, so that a clock can be extracted without coding a transmitted data signal. Furthermore, if WDM signals at a plurality of wavelengths are time-division demultiplexed in a receiver station, only one optical receiver will suffice. Thus, circuits in the transmitter and receiver stations can be greatly reduced.

Except as otherwise disclosed herein, the various components shown in outline or in block form in the figure are individually well-known in their internal construction and operation and are not critical either to the making or using of this invention or to a description of the best mode of the invention.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A method of performing wavelength-tuning and clock-synchronization in an optical communication network, said method comprising the steps of:

transmitting a reference signal, comprising superimposed reference wavelength and reference clock signals from a reference station;

tuning a transmitter station to a wavelength, based on a reference wavelength of the reference wavelength signal, and then transmitting a signal at the wavelength to which the transmitter station is tuned from the transmitter station; and extracting the reference clock signal from the reference signal at the transmitter station and synchronizing the signal transmitted from the transmitter station with a clock signal based on the reference clock signal extracted from the reference signal.

2. A method of wavelength-tuning and clock-synchronization according to claim 1, wherein the optical communication network transmits therethrough a multiplexed signal comprising a number of wavelengths, wherein said reference signal transmitting step comprises the steps of:

modulating current at fixed periods each of which is the number of wavelengths in the multiplexed signal in the optical communication network times a system clock period;

modulating a wavelength of a light beam based on the modulated current; and outputting the light beam of the modulated wavelength from wavelength modulating means; and receiving the outputted modulated light beam with a light wavelength selector and transmitting from the light wavelength selector only light of a plurality of transmission wavelengths disposed at constant intervals.

3. A method of wavelength-tuning and clock-synchronization according to claim 1, wherein a extracting means extracts the reference clock signal from the reference signal.

4. A method of wavelength-tuning and clock-synchronization according to claim 1, wherein said tuning step comprises the step of detecting a difference between the reference wavelength of the reference signal and the wavelength of the signal to be transmitted from the transmitter station and maintaining the wavelength difference at a constant value.

5. A wavelength division multiplexing optical communication network, said network comprising:
 a reference station for transmitting a reference signal comprising superposed reference wavelength and reference clock signals;
 a transmitter station for transmitting a signal therefrom, wherein said transmitter station is tuned to a a wavelength, based on a reference wavelength of the reference wavelength signal so that said transmitter station transmits a signal at the wavelength to which said transmitter station is tuned, wherein said transmitter station extracts the reference clock signal from the reference signal and synchronizes the signal transmitted from said transmitter station with a clock signal based on the reference clock signal extracted from the reference signal.

6. A wavelength division multiplexing optical communication network according to claim 5, wherein said network transmits therethrough a multiplexed signal comprising a number of wavelengths, wherein said reference station comprises:
 current modulating means for modulating current at fixed periods each of which is the number of wavelengths in the multiplexed signal in said optical communication network times a system clock period;
 wavelength modulating means for modulating a wavelength of a light beam based on the modulated current from said current modulating means and outputting the light beam of the modulated wavelength; and
 a light wavelength selector for receiving the outputted modulated light beam and transmitting therefrom only light of plurality of transmission wavelengths disposed at constant intervals, and wherein the light of the transmission wavelengths comprises the reference signal.

7. A wavelength division multiplexing optical communication network according to claim 5, wherein said transmitter station comprises extracting means for extracting the reference clock signal from the reference signal.

8. A wavelength division multiplexing optical communication network according to claim 5, wherein said transmitter station comprises means for detecting a difference between the reference wavelength of the reference signal and the wavelength of the signal to be transmitted from said transmitter station and for maintaining the wavelength difference at a constant value to tune said transmitter station to the wavelength of the signal to be transmitted.

9. A wavelength division multiplexing optical communication network according to claim 5, further comprising a single transmission line for connecting said reference station and said transmitter station.

10. A method of performing wavelength-tuning and clock-synchronizing in an optical communication network, said method comprising the steps of:
 transmitting a reference signal, comprising superimposed reference wavelength and reference clock signals, from a reference station;
 tuning a transmitter station to a wavelength, based on a reference wavelength of the reference wavelength signal, and then transmitting a signal at the wavelength to which the transmitter station is tuned from the transmitting station;
 extracting the reference clock signal from the reference signal with the transmitter station and synchronizing the signal transmitted from the transmitter station with a clock signal based on the reference clock signal extracted from the reference signal;
 extracting the clock signal from the reference signal in a receiver station; and
 receiving in the receiver station wavelength-division-multiplexed signals as time-division-demultiplexed parallel data by using the extracted clock signal extracted in the receiver station.

11. A method of performing wavelength-tuning and clock-synchronizing according to claim 10, wherein the reference signal transmitting step comprises the steps of:
 modulating current at fixed periods each of which is the number of wavelengths in the wavelength-division-multiplexed signals in the optical communication network times a system clock period;
 modulating a wavelength of a light beam based on the modulated current and outputting the light beam of the modulated wavelength from wavelength modulating means; and
 receiving the outputted modulated light beam with a light wavelength selector and transmitting from the light wavelength selector only light of a plurality of transmission wavelengths disposed at constant intervals.

12. A method of performing wavelength-tuning and clock-synchronizing according to claim 10, wherein extracting means extracts the reference clock signal from the reference signal.

13. A method of performing wavelength-tuning and clock-synchronizing according to claim 10, wherein said tuning step comprises the steps of detecting a difference between the reference wavelength of the reference signal and the wavelength of the signal to be transmitted, from the transmitter station and maintaining the wavelength difference at a constant value.

14. A method of performing wavelength-tuning and clock-synchronizing according to claim 10, further comprising the steps of:
 using extracting means for extracting the clock signals in said extracting step from the reference signal in said receiver station;
 optically filtering the received wavelength-division-multiplexed signals as time-division demultiplexed parallel data with an optical filter whose transmission wavelength is controlled in accordance with the clock signal extracted by the extracting means;
 converting the optically filtered wavelength-division-multiplexed signals from the optical filter into serial electrical signals representing serial data; and
 converting the serial data to the time-division-demultiplexed parallel data.

15. A wavelength division multiplexing optical communication network, said network comprising:

a reference station for transmitting a reference signal comprising superposed reference wavelength and reference clock signals;

a transmitter station for transmitting a signal therefrom, wherein said transmitter station is tuned to a wavelength, based on a reference wavelength of the reference wavelength signal so that said transmitter station transmits a signal at the wavelength to which said transmitter station is tuned, wherein said transmitter station extracts the reference clock signal from the reference signal and synchronizes the signal transmitted from said transmitter station with a clock signal, based on the reference clock signal extracted from the reference signal; and a receiver station for receiving wavelength-division-multiplexed signals as time-division-demultiplexed parallel data by using a clock signal extracted from the reference signal.

16. A wavelength division multiplexing optical communication network according to claim 15, wherein said network transmits therethrough a multiplexed signal comprising a number of wavelengths therein, wherein said reference station comprises:

current modulating means for modulating current at fixed periods each of which is the number of multiplexed wavelengths in said optical communication network times a system clock period;

wavelength modulating means for modulating a wavelength of a light beam based on the modulated current from said current modulating means and outputting the light beam of the modulated wavelength; and a light wavelength selector receiving the outputted modulated light beam and transmitting therefrom only light of a plurality of transmission wavelengths disposed at constant intervals, and wherein the light of the transmission wavelengths comprises the reference signal.

17. A wavelength division multiplexing optical communication network according to claim 15, wherein said transmitter station comprises extracting means for extracting the reference clock signal from the reference signal.

18. A wavelength division multiplexing optical communication network according to claim 15, wherein said transmitter station comprises means for detecting a difference between the reference wavelength of the reference signal and the wavelength of the signal to be transmitted from said transmitter station and for maintaining the wavelength difference at a constant value to tune said transmitter station to the wavelength of the signal to be transmitted.

19. A wavelength division multiplexing optical communication network according to claim 15, wherein said receiver station comprises:

extracting means for extracting the clock signal from the reference signal;

an optical filter, for filtering the wavelength-division multiplexed signals, whose transmission wavelength is controlled in accordance with the timing of the clock signal extracted by said extracting means;

converting means for converting the filtered wavelength-division-multiplexed signals from said optical filter to serial electrical signals representing serial data; and time-division-demultiplexing means for converting the serial data from said converting means to the time-division-demultiplexed parallel data.

20. A wavelength division multiplexing optical communication network according to claim 15, further comprising a single transmission line for connecting said reference station, said transmitter station and said receiver station.

* * * * *

UNITED STATES PATENT AND TRADEMARK OFFICE
CERTIFICATE OF CORRECTION

PATENT NO. : 5,361,154  Page 1 of 3
DATED : November 1, 1994
INVENTOR(S) : TORU NAKATA It is certified that error appears in the above-indentified patent and that said Letters Patent is hereby corrected as shown below:

COLUMN 1:

Line 15, "office" should read --station--.

Line 40, "122" (second occurrence) should be deleted.

Line 41, "wavelengths, an" should read --wavelengths. The reference station also has an--.

COLUMN 2:

Line 2, "the" should be deleted.

Line 7, "office." should read --station,--.

Line 63, "222" should be deleted.

COLUMN 4:

Line 56, "signal" should read --signal,--.

Line 57, "station" should read --station,--.

UNITED STATES PATENT AND TRADEMARK OFFICE
CERTIFICATE OF CORRECTION

PATENT NO. : 5,361,154        Page 2 of 3
DATED : November 1, 1994
INVENTOR(S) : TORU NAKATA It is certified that error appears in the above-indentified patent and that said Letters Patent is hereby corrected as shown below:

COLUMN 5:

Line 59, "EMBODIMENT" should read --EMBODIMENTS--.

COLUMN 6:

Line 8, "numeral 51-54" should read --numerals 51-54--.

Line 11, "lights" should read --light--.

COLUMN 9:

Line 15, "manner," should read --manner--.

COLUMN 10:

Line 27, "is" should read --are--.

COLUMN 11:

Line 2, "a" should read --an--.

UNITED STATES PATENT AND TRADEMARK OFFICE
CERTIFICATE OF CORRECTION

PATENT NO. : 5,361,154

DATED : November 1, 1994

INVENTOR(S) : TORU NAKATA

It is certified that error appears in the above-indentified patent and that said Letters Patent is hereby corrected as shown below:

<u>ABSTRACT</u>:

Line 2, "office" should read --station--.

Line 6, "office" should read --station--.

Line 10, "office" should read --station--.

Signed and Sealed this

Second Day of May, 1995

Attest:

BRUCE LEHMAN

*Attesting Officer*  *Commissioner of Patents and Trademarks*